United States Patent [19]

Rumreich et al.

[11] Patent Number: 5,005,201

[45] Date of Patent: Apr. 2, 1991

[54] APPARATUS AND METHOD THEREOF FOR IMPROVEMENT OF STEREOPHONIC SOUND

[75] Inventors: Mark F. Rumreich; Robert P. Parker, both of Indianapolis, Ind.

[73] Assignee: RCA Licensing Corporation, Princeton, N.J.

[21] Appl. No.: 310,102

[22] Filed: Feb. 14, 1989

[51] Int. Cl.$^5$ .............................................. H04R 5/02
[52] U.S. Cl. .................................................... 381/24
[58] Field of Search ................................... 381/24, 27

[56] References Cited

U.S. PATENT DOCUMENTS

| | | | |
|---|---|---|---|
| 3,417,203 | 12/1968 | Hafler | 179/1 |
| 3,933,219 | 1/1976 | Butler | 181/144 |
| 3,934,092 | 1/1976 | Csicsatka | 179/15 |
| 4,002,835 | 1/1977 | Bumber | 179/1 |
| 4,308,423 | 12/1981 | Cohen | 179/1 |
| 4,355,203 | 10/1982 | Cohen | 179/1 |
| 4,410,761 | 10/1983 | Schickedanz | 381/24 |
| 4,524,451 | 6/1985 | Watanabe | 381/1 |
| 4,646,349 | 2/1987 | Puls | 381/24 |
| 4,704,728 | 11/1987 | Scheiber | 381/22 |

FOREIGN PATENT DOCUMENTS

| | | | |
|---|---|---|---|
| 0003600 | 1/1986 | Japan | 381/24 |
| 894900 | 4/1962 | United Kingdom | 381/24 |
| 2185655 | 7/1987 | United Kingdom | 381/24 |

OTHER PUBLICATIONS

Allied Electronics, Catalog 270, 1968, p. 95, Item 20 B9131ZF.
Montgomery Ward Catalog, Fall & Winter 1981, p. 1020, Item H(62C3245R).
University Loudspeakers, Inc., Ad for TMS-2, p. 34 of Radio & TV News, Dec., 1958.

*Primary Examiner*—Forester W. Isen
*Attorney, Agent, or Firm*—Joseph S. Tripoli; Peter M. Emanuel; Frederick A. Wein

[57] ABSTRACT

An apparatus and method for improvement of stereophonic sound. A source of stereophonic sound is provided with two internal loudspeakers and external access to the stereophonic signal. A "wall of sound" effect is achieved by coupling of the sterophonic signal to at least two external loudspeakers with the internal loudspeakers being fed a mixture of the sterophonic signal at reduced power.

4 Claims, 3 Drawing Sheets

APPARATUS AND METHOD THEREOF FOR IMPROVEMENT OF STEREOPHONIC SOUND

The present invention relates to improving stereophonic sound produced by television sets, and more particularly, to improving the quality and directionality of the sound produced by internal loudspeakers of said television sets.

BACKGROUND

It is common on so-called "table top" or "portable" television sets to have stereophonic loudspeakers aimed outwardly from both sides of the set rather than having the loudspeakers aimed from the front of the set towards the viewer. This is done for several reasons. First, it is desirable to keep the cabinet as small as possible for economics. The smaller the cabinet size, the less material that is used in producing the cabinet which permits lower costs in production as well as in shipping. Second, it is desirable to keep the cabinet as small as possible for customer convenience to permit the customer the greatest flexibility in placing the television set for viewing.

The perceived directionality of the stereophonic sound provided by speakers aimed from the sides of a television set is greatly reduced since the sound is aimed away from the viewer towards the reflecting walls of the room. Even if the speakers are aimed from the front of a "table top" television set, the loudspeakers may be of relatively poor quality for several reasons. First, the quality of the speakers used on the table model television sets usually have limited bass response and power capability. Second, the stereophonic directionality of such table top model speakers is minimal since the spacing between the loudspeakers is limited by the size of the cabinet which often is inadequate for providing an adequate spatial stereophonic perception.

Accordingly, it is desirable to improve the spatial directionality of the stereophonic sound as perceived by the viewer above and beyond that provided by the speakers disposed internal of the television set even when said loud speakers are forwardly facing, and especially when they are side facing. It is also desirable to permit the user of the television set to improve the quality of the sound production above and beyond the speakers provided internal of the cabinet of the television set.

SUMMARY OF THE INVENTION

Briefly, the present invention provides for apparatus and method thereof for improving the stereophonic sound from a source, such as a "table top" or "portable" television set or other source providing stereophonic sound, having at least two loudspeakers disposed within the cabinet of the source with the signal fed to the internal loudspeakers being eternally accessible through a jack or the like. It is intended that at least two other loudspeakers be provided external to the source and that the external loudspeakers desirably be disposed in a spaced apart relationship greater than the spaced apart relationship of the internal loudspeakers with said external speakers facing in the direction of the listener. The stereophonic channels are fed to the external loudspeakers while a mixture of the stereophonic channels, i.e., a difference signal of the stereophonic channels, is fed to each of the internal loudspeakers at a power level less than the power fed to each of the external speakers. As will be explained in more detail below, in this manner the stereophonic spatial separation of the channels is improved, the external loud speakers can provide improved frequency response, and the internal speakers, operating at lower power, greatly improves the spatial quality of the sound by adding what is perceived to be "reflected ambiance". The effect of the "reflected ambiance" creates an effect of an "wall of sound" rather than the point sources of sound from the external speakers only.

DESCRIPTION OF THE DRAWINGS

For a better understanding of the present invention, reference may be had to the accompanying drawings wherein.

DETAILED DESCRIPTION OF THE PREFERRED EMBODIMENT

Commonly, the internal speakers of a television set having stereophonic sound capability are mounted at the diametrically opposed sides of the cabinet radiating their acoustic sound responses in opposite directions orthogonal to the direction of the viewer who usually is generally positioned in front of the display device, e.g., a CRT. In such a situation, the stereophonic spatial perception of the left side sound which should appear to come from the left side and the right side sound which should appear to come from the right side is reduced in effect. This situation is common for a number of reasons.

Firstly, the stereo sound is not directionality aimed in the direction of the viewer or listener, as the case may be. The listener hears reflections and reflections of reflections with substantial mixing of the left and right side sounds being received by each ear. Additionally, these reflections are spread over a large wall area making the perceived direction of a particular sound very indefinite. Moreover, whatever directionality there is, the directionality changes with the position of the listener.

Secondly, for a "table top" or "portable" television set or the like, the distance between the speakers, even if the speakers were disposed in front of the cabinet and aimed at the viewer, is limited to the dimensions of the cabinet which typically is insufficient for an adequate stereophonic effect.

Thirdly, the loudspeakers provided with "table top" or "portable" televisions sets may not be of the highest quality.

Accordingly, it is desirable to improve the stereophonic effect and quality of sound from many television sets.

It is known that improved sound can be accomplished with the use of external speakers having a greater separation than the separation between the loudspeakers internal to the television set, and having improved quality with respect to the loudspeakers internal to the television set. According to one aspect of the present invention, this sound improvement can be further enhanced by using the loudspeakers internal to the television set in conjunction with the external speakers. In such a case, the internal speakers are used to provide a mixture or blend of the stereophonic output, e.g., a difference signal of the stereophonic channels, and thus provide a spatial quality of sound simulating a reflected ambiance which creates a more effective "wall of sound" rather than the point sources of sound provided by the spaced apart external speakers alone.

Figure 1:
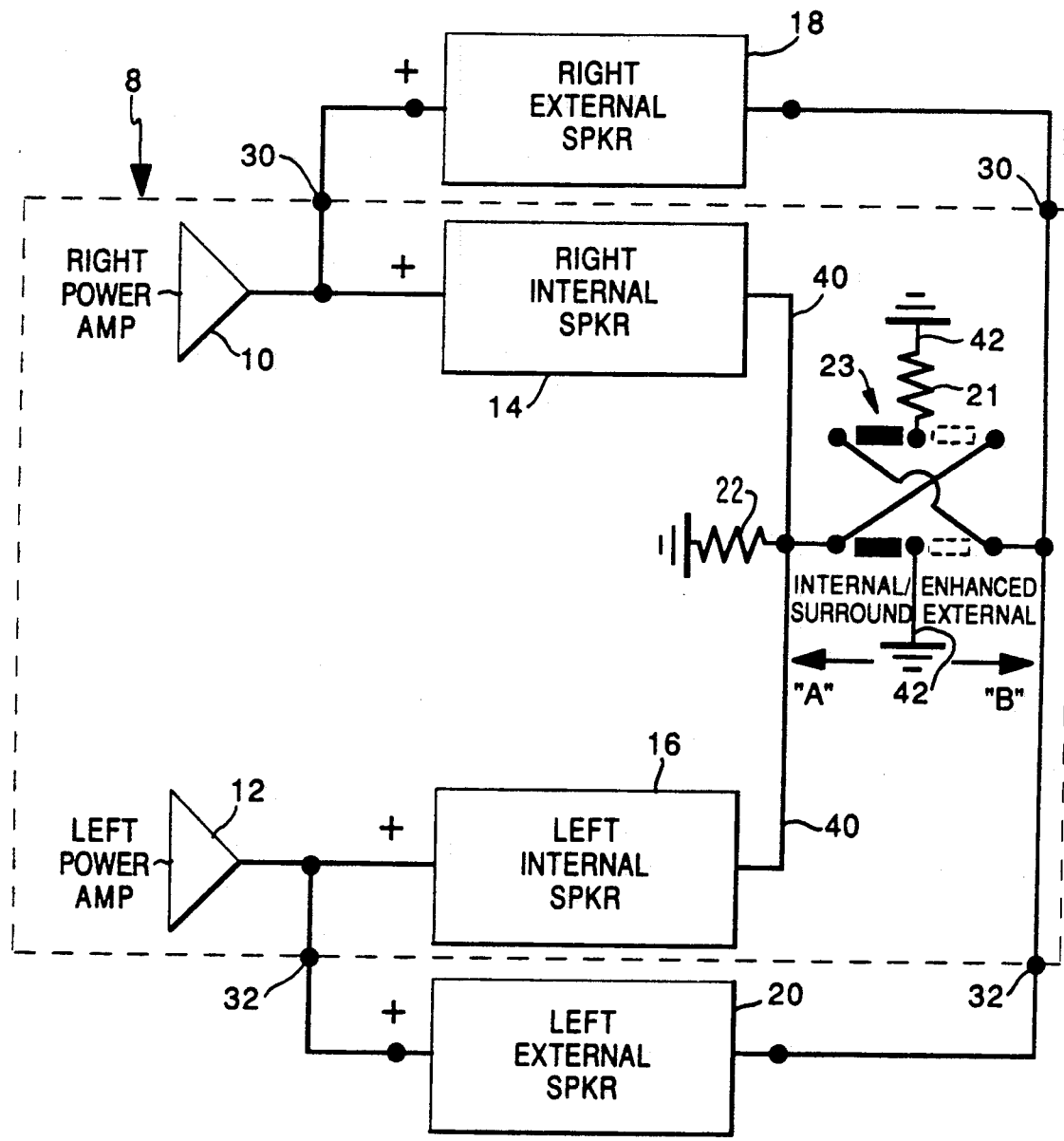
FIG. 1 shows a block diagram according to an aspect of the present invention.

Referring now to the drawings, wherein like members of the figures have been identified by like numerals, there is shown in FIG. 1 a block diagram schematic of an apparatus for enhancing the stereophonic sound available from a television set, or any other source or device for producing stereophonic sound.

As is typical, the stereophonic device shown in FIG. 1 and generally designated 8, has a right channel power amplifier 10 for amplifying a right side signal and feeding the amplified result to a right internal loudspeaker 14 providing a right side sound to the listener. Similarly, a left channel power amplifier 12 provides an amplified left side signal to a left internal speaker 16. Both speakers 14 and 16 are disposed in spaced apart relationship within a cabinet 24 (See FIG. 2) and are hard wired to their respective power amplifiers 10 and 12. Power amplifers 10 and 12 can be any amplifer, operational amplifier, or intergrated circuit common in the art.

According to an aspect of the present invention, external right and left speakers 18 and 20 are connected in parallel with the respective internal speakers without disconnecting of the internal speakers 14 and 16. However, in appropriate modes which will be discussed more fully hereinafter, selected resistors 21 and 22 are inserted by a switch 23 in series with the common ground side of the internal speakers 14 and 16 and in series the common ground side of external loudspeakers 18 and 20 as appropriate.

The external speakers 18 and 20 are intended to be separately housed in their own cabinet structures and spaced as widely apart as possible To achieve the maximum beneficial effect, external speakers 18 and 20 should have a spaced apart relationship larger than the spaced apart relationship of internal speakers 14 and 16. In the alternative, external speakers 16 and 18 can also be housed within a stand or cart 26 as shown in FIG. 2.

Figure 2:
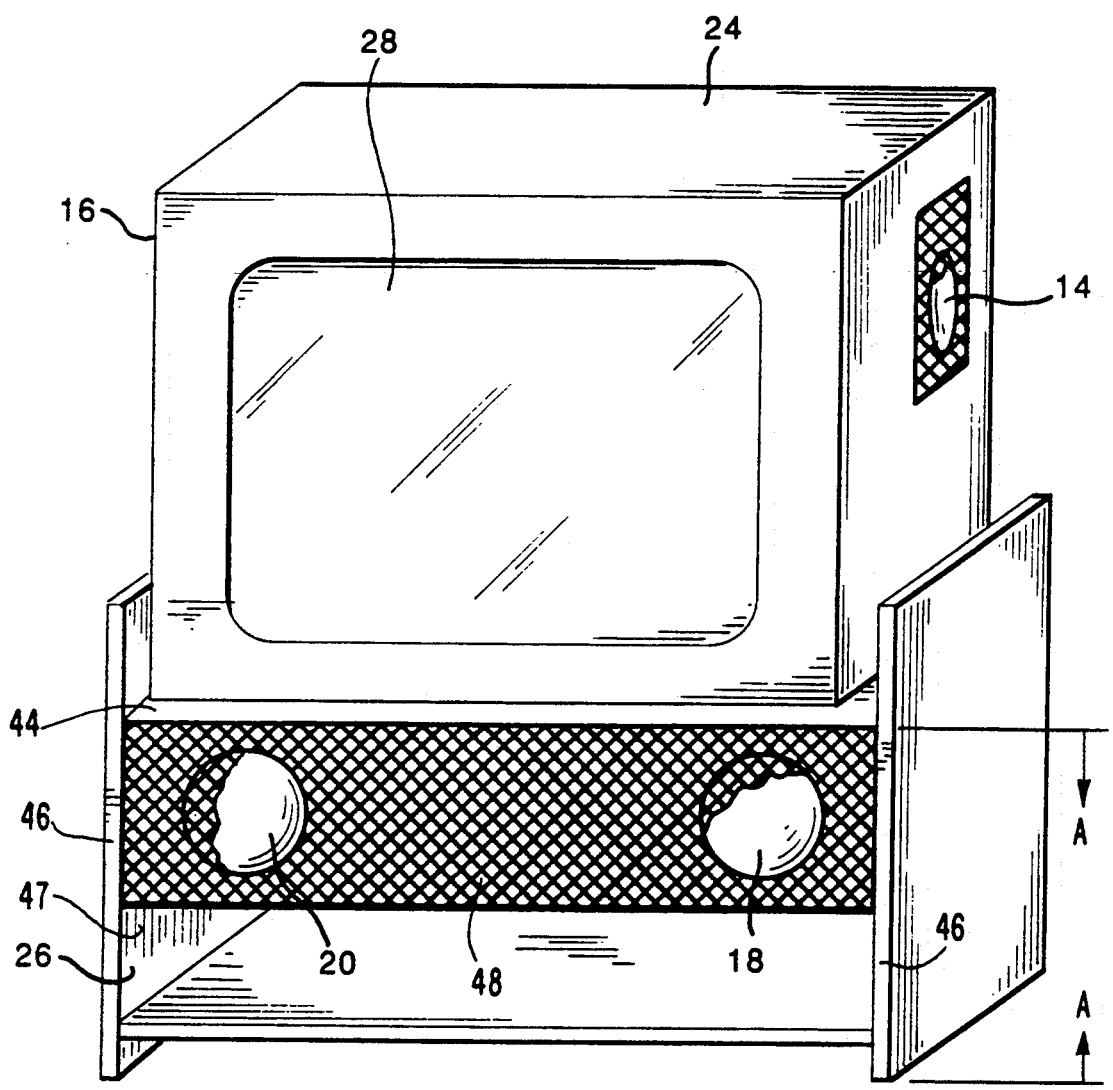
FIG. 2 shows a representation of a television set and a stand according to another aspect of the present invention.

Referring now to FIG. 2, there is shown a representation of a cabinet 24 of a television set having internal stereophonic speakers 14 and 16 with external speakers 18 and 20 mounted within a stand 26. Stand 26 includes a raised platform 44 for receiving and supporting the television set 24 thereon. Raised platform 44 is supported above a floor or other gravity supporting surface (not shown) by a pair of vertical walls 46. Raised platform 44 has a predetermined height as indicated by vertical dimension "A".

External loudspeakers 18 and 20 are disposed within a speaker enclosure 48. Enclosure 48 is supportingly mounted underneath raised platform 44 within a volume 47 with enclosure 48 having a dimension in the vertical direction which is less than dimension "A" of the vertical walls 46. In the exemplary embodiment, enclosure 48 is supportingly mounted to a lower surface of raised platform 44 as well as to an inner sides of walls 46.

Internal loudspeakers 14 and 16 are aimed at right angles to the viewer. Stand 26 is designed to receive and support the television set on raised platform 44 in a predetermined directional orientation with loudspeakers 18 and 20 being aimed towards the viewer in the same general direction as CRT screen 28. In an alternative embodiment (not shown), the internal speakers 14 and 16 can be disposed facing frontward in which case it is preferred that external speakers 18 and 20 can be disposed in a greater spaced apart relationship than the internal speakers 14 and 16. In either case, It is desirable that speakers 18 and 20 have greater frequency response and lower distortion than internal speakers 14 and 16. Additionally, speakers 18 and 20 when housed in a fully enclosed and baffled box within stand 26 typical would have improved bass response and can have a larger magnet structure than speakers 14 and 16 for lower distortion and improved efficiency.

Referring again to FIG. 1, the external loud speakers 18 and 20 are coupled to their respective power amplifiers 10 and 12 and internal ground 42 through external connect terminals or "jacks" 30 and 32 respectively. Switch 23 is disposed within cabinet 24 and controllable by the listener.

There are three modes available with the structure shown in FIG. 1. A first mode, designated "internal", is chosen by moving switch 23 into the left position shown by arrow "A". In this mode, it is intended that no external speakers are connected by the listener to terminals 30 and 32 and the full power of each channel is provided to the respective internal speakers 14 and 16 with a low side common lead 40 being directly connected to internal ground 42.

A second mode, designated "surround", is chosen by moving switch 23 into the left position shown by arrow "A" as in the first mode discussed hereinabove. However, in this mode the external speakers 18 and 20 are intended to be connected to respective terminals 30 and 32. In this "surround" mode as in the "internal" mode, the full power of each channel is provided to the respective internal speakers 14 and 16, with low side common lead 40 of speakers 14 and 16 being directly connected to internal ground 42 as in the "internal" mode. Additionally, external speakers 18 and 20 are coupled to internal ground 42 through resistor 21. In the "surround" mode external speakers 18 and 20 are driven at reduced power and are intended to be placed behind the listener to provide a "fill in" sound response. In the exemplary embodiment, resistor 21 is 33 ohms when speakers 18 and 20 have a nominal eight ohms impedance. Naturally resistor 21 should have a sufficient power rating as required.

Figure 3:
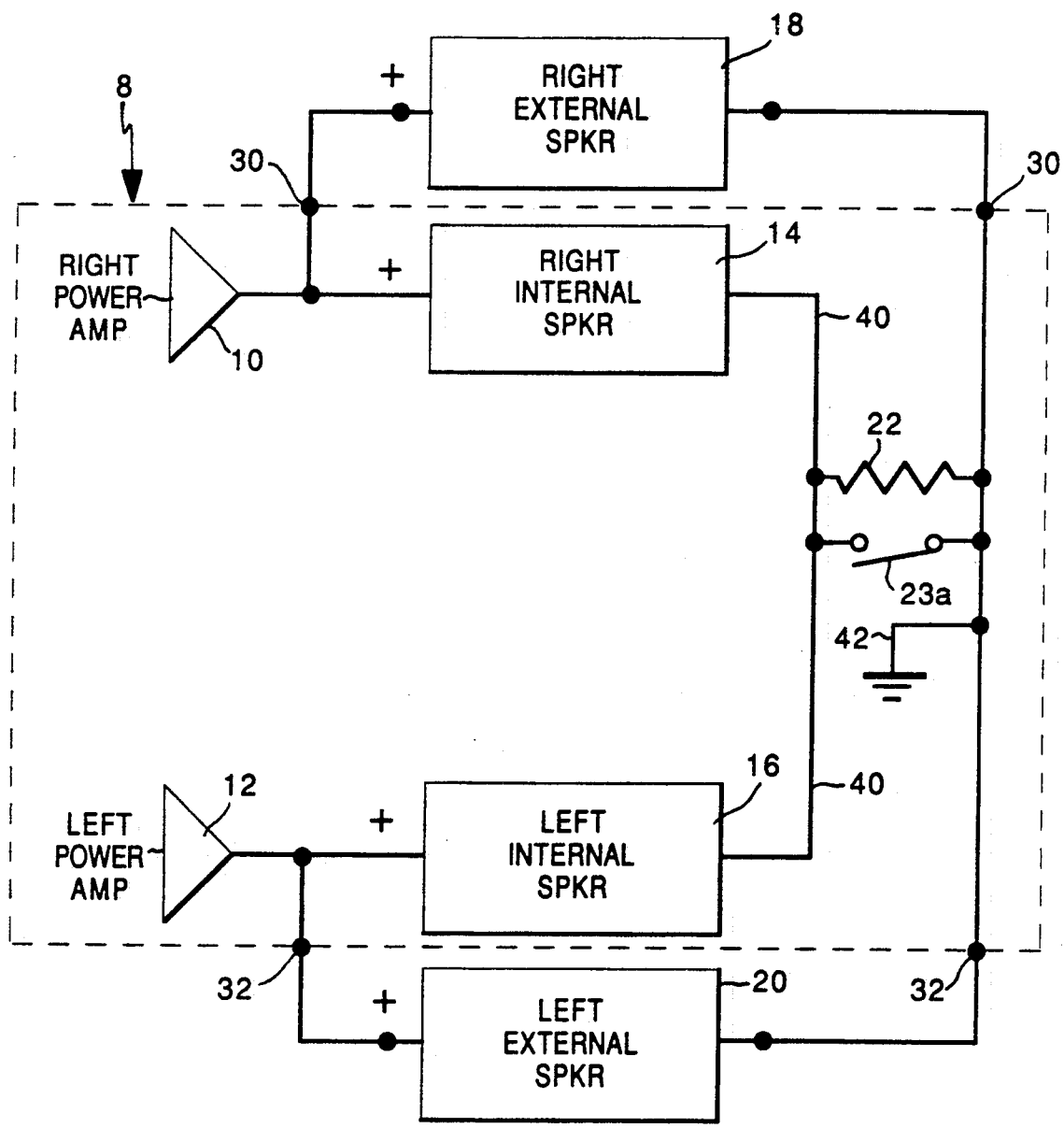
FIG. 3 shows a block diagram according to another aspect of the present invention.

A third mode designated "enhanced external", is chosen by moving switch 23 into the right position shown by arrow "B". In this mode, it is intended that external speakers 18 and 20 are connected to terminals 30 and 32, respectively and spaced apart by a distance greater than the distance between internal speakers 14 and 16 and aimed toward the listener. In this mode, the external speakers 18 and 20 are driven at full power, but the internal speakers 14 and 16 are driven at a lower power with accentuated difference components. This "enhanced external" mode greatly improves the spacial quality of the sound by adding "reflected ambience". It has been found that the "reflected ambience" creates more of a "wall of sound" rather than the point sources of sound emanating only from the external speakers 18 and 20 as would normally be the case. The equivalent circuit or simpler version of the structure for the "enhanced external" mode is shown in FIG. 3 with switch 23 being shown as a single pole single throw switch designated as 23a.

In the "internal" or "surround" mode resistor 22 is short circuted. Referring now to FIG. 3 there is shown in the "external enhanced" mode the switch 23a is opened for removing to short circuit across resistor 22 thus placing resistor 22 in series with the common terminals 40 of internal speakers 14 and 16. The value of resistor 22 is selected for effectuating the desirable attenuation and in the exemplary embodiment is an 18 ohm resistor of appropriate power capability with speakers 14 and 16 being 8 ohms each. In such a configuration, loudspeakers 14 and 16 will be primarily driven by the difference signal substantially equal to the difference between the right and left signals divided by two. More particularly, the right internal speaker 14 will have a signal therethrough of 0.59R−0.41L and left speaker 16 will have a signal therethrough of 0.59L−0.41R. These values for the signals through the respective internal speakers 14 and 16 are easily derived by those skilled in the art considering the voltage division between the two internal speakers 14 and 16, and 18 ohm resistor 22 and considering that the output impedances of power amplifiers 10 and 12 are much lower than 8 ohms. The relationship of the left and right difference components can be changed by changing the resistance value of resistor 22. Thus, the internal speakers 14 and 16 are provided with an attenuated difference signal which has been found to be an appropriate signal for an ambiance "fill in" sound.

For the case of a monophonic signal (L=R) and with reference to the above stereo signal values the signal to the left internal speaker 16 is 0.18L (0.59L−0.41L =0.18L), which is 15DB below the level in the left external speaker 20 and a similar condition is present for the right internal speaker 14.

Thus, there has been disclosed an apparatus and method for improving the stereophonic sound from the source such as a television set or the like wherein the stereophonic spatial effect of the stereo sound is improved, and a "wall of sound" effect of an ambiance signal is provided by the original speakers internal to the source.

While there has been illustrated and described what is at present considered to be a preferred embodiment of the present invention, it will be appreciated that numerous changes and modifications are likely to occur to those skilled in the art and it is intended in the appended claims to cover all those changes and modifications which fall within the true spirit and scope of the present invention.

What is claimed:

1. Apparatus for improving stereophonic sound from a source comprising:

a source of stereophonic sound having a cabinet and two internal loudspeakers disposed in a first spaced apart relationship within the cabinet and driven by stereophonic signal channels internal of the cabinet, said internal loudspeakers providing stereophonic sound external of the cabinet, means for coupling the stereophonic signals to at least two other loudspeakers disposed eternal of the source, and means for coupling a mixture of the stereophonic channels to said two internal loudspeakers at reduced power with respect to the external loudspeakers, said mixture of stereophonic channels comprising difference signals of said stereophonic channels.

2. The apparatus of claim 1 wherein the external loudspeakers are disposed in a second spaced apart relationship greater than the first spaced apart relationship and said external loudspeakers are directionally aimed toward the listener.

3. The apparatus of claim 2 wherein the source is a television set having a viewable screen and said screen is aimed in the same general direction as the external loudspeakers.

4. A method for providing an improved stereophonic sound from a device having an internal stereophonic signal of stereophonic channels, and two loudspeakers disposed in a spaced apart relationship internal of the device and drivable by the stereophonic signal comprising the following steps of:

providing means for accessing the stereophonic signal and the two internal loudspeakers, and providing means for coupling the stereophonic signal to at least two external loudspeakers and coupling a mixture of the stereophonic signal to the two internal loudspeakers at reduced power with respect to the external loudspeakers, said mixture of the stereophonic signal comprising a difference signal of said stereophonic channels.

* * * * *